US008279897B2

(12) United States Patent
Lee et al.

(10) Patent No.: US 8,279,897 B2
(45) Date of Patent: Oct. 2, 2012

(54) SYNCHRONIZATION IN A WIRELESS NODE (75) Inventors: Jung Gun Lee, Palo Alto, CA (US);
Raul Herman Etkin, San Francisco, CA (US); Sung-Ju Lee, San Francisco, CA (US); Anil Gupta, Shrewsbury, MA (US); Vincent Ma, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 12/715,774

(22) Filed: Mar. 2, 2010

(65) Prior Publication Data
US 2011/0216660 A1 Sep. 8, 2011

(51) Int. Cl.
*H04J 3/06* (2006.01)
*H04L 7/00* (2006.01)
*H04B 15/00* (2006.01)
(52) U.S. Cl. .................. 370/503; 375/356; 455/502
(58) Field of Classification Search .................. None
See application file for complete search history.

(56) References Cited

U.S. PATENT DOCUMENTS

2009/0006882 A1* 1/2009 Manapragada et al. ...... 713/600
2009/0290572 A1* 11/2009 Gonia et al. .................. 370/350

OTHER PUBLICATIONS

Basharat, et al. "A Framework for Intelligent Sensor Network with Video Camera for Structural Health Monitoring of Bridges." Proceedings of the 3rd International Conference on Pervasive Computing and Communications Workshops. Retrieved on Jan. 8, 2010 from IEEE Xplore.
Arms, et al. "Energy Harvesting Wireless Sensors and Networked Timing Synchronization for Aircraft Structural Health Monitoring." MicroStrain Inc., Williston, VT; Rotary Wing/Patrol Aircraft Branch, U.S. Navy/NAVAIR, Naval Air Systems Command, Lexington Park, MD, 2009.

* cited by examiner

Primary Examiner — Clemence Han (57) ABSTRACT

A wireless node receives a beacon from a wireless access point. The beacon includes a wireless protocol time synchronization function (TSF) timestamp generated with reference to a global clock for a network. The wireless node synchronizes a counter according to the TSF timestamp. The wireless node receives a global timing offset (GTO) packet from the wireless access point and combines the GTO packet with a counter value to generate a global timestamp.

19 Claims, 5 Drawing Sheets

SYNCHRONIZATION IN A WIRELESS NODE

BACKGROUND

Many monitoring and/or sensing applications use deployed sensors to collect sensory data (e.g., temperature, light, movement, etc.). In certain situations, collection of sensory data from different sensors is coordinated (e.g., in time, distance, quantity, etc.).

In some wireless networks, access points periodically broadcast beacon frames to wireless nodes within the access point's cell/cluster area. Beacon frames can include a variety of information, including timing information.

BRIEF DESCRIPTION OF DRAWINGS

The following description includes discussion of figures having illustrations given by way of example of implementations of embodiments of the invention.

DETAILED DESCRIPTION

Many wireless applications, including certain monitoring and sensing applications, seek to have accurate synchronization among wireless nodes. One example is seismic oil exploration, in which high synchronization accuracy is sought among all sensor nodes in the survey field. The higher the accuracy, the better the quality of the sensed data. Given that many wireless sensor nodes are limited in terms of power, size and manufacturing cost, equipping every node with an accurate timing source, such as a GPS (Global Positioning System) clock or an atomic clock, is not practical in many cases.

Network timing protocols, such Network Time Protocol (NTP) and IEEE Precise Time Protocol (PTP) are designed to operate in a cable-based local area network (LAN) where transmission delays are more predictable than in wireless settings. These protocols allow timing information to be communicated via time-stamped message transmissions. While it is possible to use these protocols in wireless LANs to synchronize local nodes to a master clock (e.g., located on an access point), the achievable timing accuracy is highly dependent on the wireless channel conditions and network traffic. Based on the IEEE 802.11 standard, every 802.11 device has a time synchronization function (TSF) counter, which can be used for time synchronization among nodes in the same cell. According to the 802.11 standard, each access point (AP) periodically transmits Beacon frames, which announce the presence of the wireless LAN (WLAN) network. The Beacon frames include a timestamp of the AP's TSF counter to synchronize the TSF counters of other nodes in the cell or BSS (Basic Service Set). TSF timestamps are written to the Beacon frames at the time they are sent on the physical medium, compensating for internal hardware delays (e.g., in an 802.11 chipset) and without being affected by medium access control (MAC) delays. A receiving node accepts the timing information in Beacon frames sent from the AP servicing the node's BSS. If the receiving node's TSF counter is different from the timestamp in the received Beacon frame, the receiving node sets its local TSF counter to the received timestamp value.

Various embodiments described herein leverage 802.11 TSF timestamps to achieve synchronization of an entire wireless sensor network (i.e., synchronization of nodes across different cells) to a master clock. This synchronization allows sensor nodes to set accurate timestamps on sensed data and/or sample sensory data at a proper sampling frequency. In addition, synchronization can be used to coordinate sleep/wake time of a node, medium access timing, etc.

Figure 1:
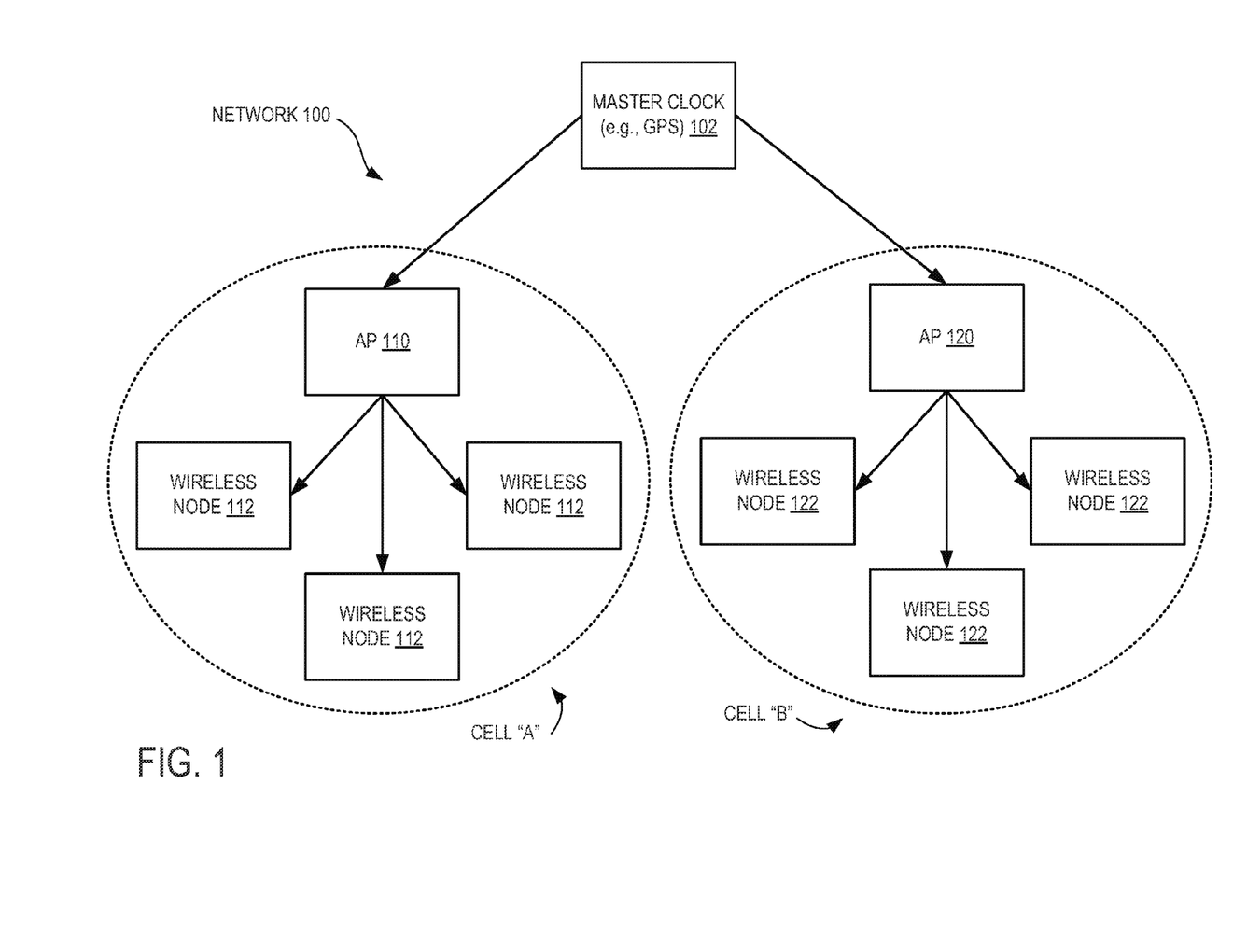
FIG. 1 is a block diagram illustrating a system according to various embodiments.

FIG. 1 is a block diagram illustrating a system according to various embodiments. Network 100 includes nodes 112 associated with AP 110 and nodes 122 associated with AP 120. Master clock 102 can be considered part of network 100 or it can be external to network 100. For clarity of discussion, only two cells (A and B) are illustrated; more cells could be used.

AP 110 and AP 120 are synchronized to master clock 102. Master clock 102 could be a GPS clock or other suitable global clock. Thus, AP 110 and AP 120 are synchronized using, for example, a GPS protocol and system. In hierarchical multi-layer implementations, AP 110 and 120 may synchronize to higher layer nodes using TSF timestamps. In various embodiments, AP 110 and 120 are synchronized using 802.11 TSF timestamps. IEEE 802.11 is an example of a wireless protocol having a timing synchronization function that can be used to generate synchronizing timestamps. In alternate embodiments, other protocols having a timing synchronization function could be used to generate similar synchronizing timestamps.

AP 110 and AP 120 each send out periodic Beacon frames with TSF timestamps. In various embodiments, the Beacon frames are transmitted with a higher transmission power than that used for transmitting regular data frames. However, it is not necessary that the transmission power be different for Beacon frames. Wireless nodes 112 and 122 detect the respective Beacon frames and synchronize their respective local counters according to the TSF timestamp in the Beacon frame. Given that the TSF counters in AP 110 and 120 are synchronized to master clock 102, the synchronization of nodes 112 and 122 to the TSF timestamps results in all of the nodes 112 and 122 having synchronized counter even though nodes 112 and nodes 122 belong to different cells in network 100.

The example system shown in FIG. 1 is an example of a 2-layer system, with the access points represent one layer and the wireless nodes representing another layer. Other embodiments could be extended to include more layers. For example, if the APs are managed by another layer of a network via a few number of higher level access points and/or base stations, then each AP could be synchronized to a higher level AP using the same TSF timestamp approach. This hierarchical approach can be extended to as many layers as desired assuming timing errors remain within a specified range for the particular application.

Figure 2:
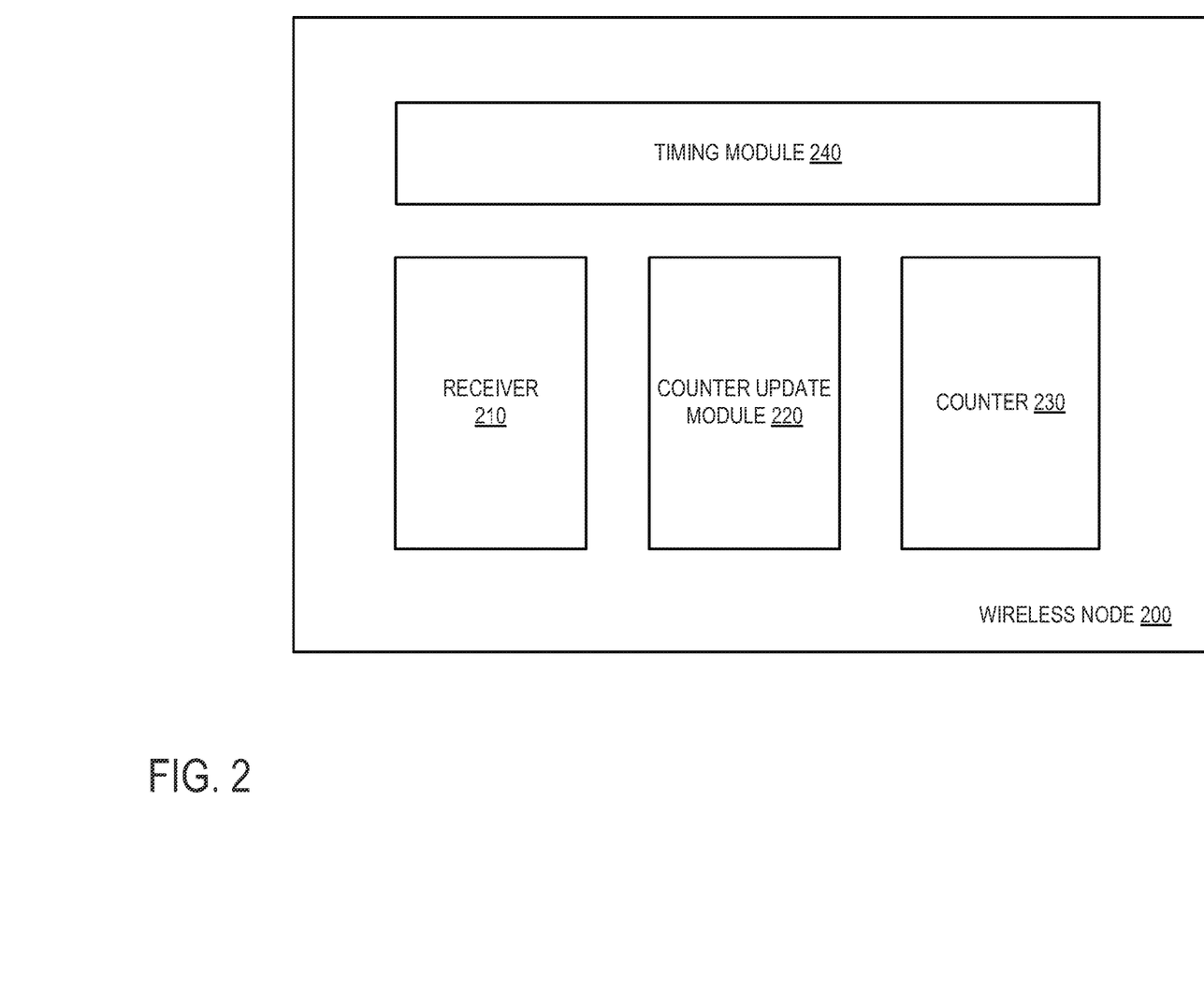
FIG. 2 is a block diagram illustrating a node according to various embodiments.

FIG. 2 is a block diagram of a wireless node according to various embodiments. Wireless node 200 includes a receiver 210 to receive a timing synchronization function (TSF) timestamp from a wireless access point in a network. As discussed above, the TSF timestamp could be generated using the IEEE 802.11 protocol; however, other wireless protocols having timing synchronization functionality could also be used. The received TSF timestamp is synchronized to a global clock (e.g., GPS).

Counter 230 is incremented according to a reference clock. The reference clock could be an internal chipset clock (e.g., an 802.11 chipset clock) or it could be a slave clock controlled by an oscillator. Counter update module 220 updates counter 220 according to the received TSF timestamp. In other words, counter update module 220 compares a TSF timestamp received at time t with the counter value at time t. If the counter value is different than the timestamp, then counter module 220 causes counter 230 to be adjusted to match the timestamp.

Timing module 240 receives a global timing offset (GTO) message (e.g., via receiver 210) from an access point (AP). GTO messages are explained in further detail below. Timing module 240 combines information from the GTO message with counter information from counter 230 to generate a global timestamp. As described in further detail below, the global timestamp can be used, for example, to tag data on the node 200. Other similar wireless nodes in a wireless network may also generate global timestamps. Given that the global timestamps are synchronized to a master clock, timestamps generated by nodes in different cells are synchronized to each other or are otherwise uniform across the entire network.

As mentioned previously, access points (APs) synchronize their respective TSF counters to a master network clock. In this way, TSF timestamps sent in Beacon frames by the APs are synchronized to the master network clock. While the TSF counters may be synchronized to tick at the same time, they may have different initialization values. Thus, in addition to broadcasting Beacon frames, APs transmit (e.g., periodically) a global timing offset (GTO) message to wireless nodes (e.g., node 200 of FIG. 2) in various embodiments. As mentioned, the GTO message is used to generate a global timestamp. The following discussion illustrates an example of how the GTO message is used in various embodiments. For example, if the master clock for the network is a GPS clock, then $T_{GPS}(t)$ represents the time elapsed (e.g., in microseconds) between a predetermined time origin (e.g., Jan. 1, 2000, 12:00 AM GMT) and time t. Let $T_{TSF}(t)$ be the value of an AP's TSF counter at time t. In the case of 802.11, the value of the TSF counter can be read from the AP's 802.11 chipset with a predictable delay that can be compensated for in the value of $T_{TSF}(t)$. The AP then computes $T_{GTO}(t)=T_{GPS}(t)-T_{TSF}(t)$ (i.e., the difference between the time since the time origin and the value of the TSF counter).

GTO packets broadcast periodically from an AP convey $T_{GTO}$ to nodes (e.g., node 200). In various embodiments, a timing module on the node (e.g., timing module 240) computes $T_{GPS}(t)=T_{GTO}(t) T_{TSF}(t)$, where $T_{TSF}(t)$ is the value of the TSF counter of the wireless node at time t. Since $T_{TSF}(t)$ may drift with respect to $T_{TSF}(t)$ (e.g., if the oscillator on the node is imprecise), the value of $T_{GPS}(t)$ is more accurate if computed soon after a TSF beacon is received. During the interval between beacons, timing module 240 may estimate $T_{GPS}(t)$ using an internal node clock that compensates for the drift in the chipset clock. In alternate embodiments, other factors can be included in the calculation to improve the accuracy of the global timestamps. For example, the calculation of $T_{GPS}(t)$ could compensate for AP-to-node distance and the corresponding propagation delay of the wireless signal.

Figure 3:
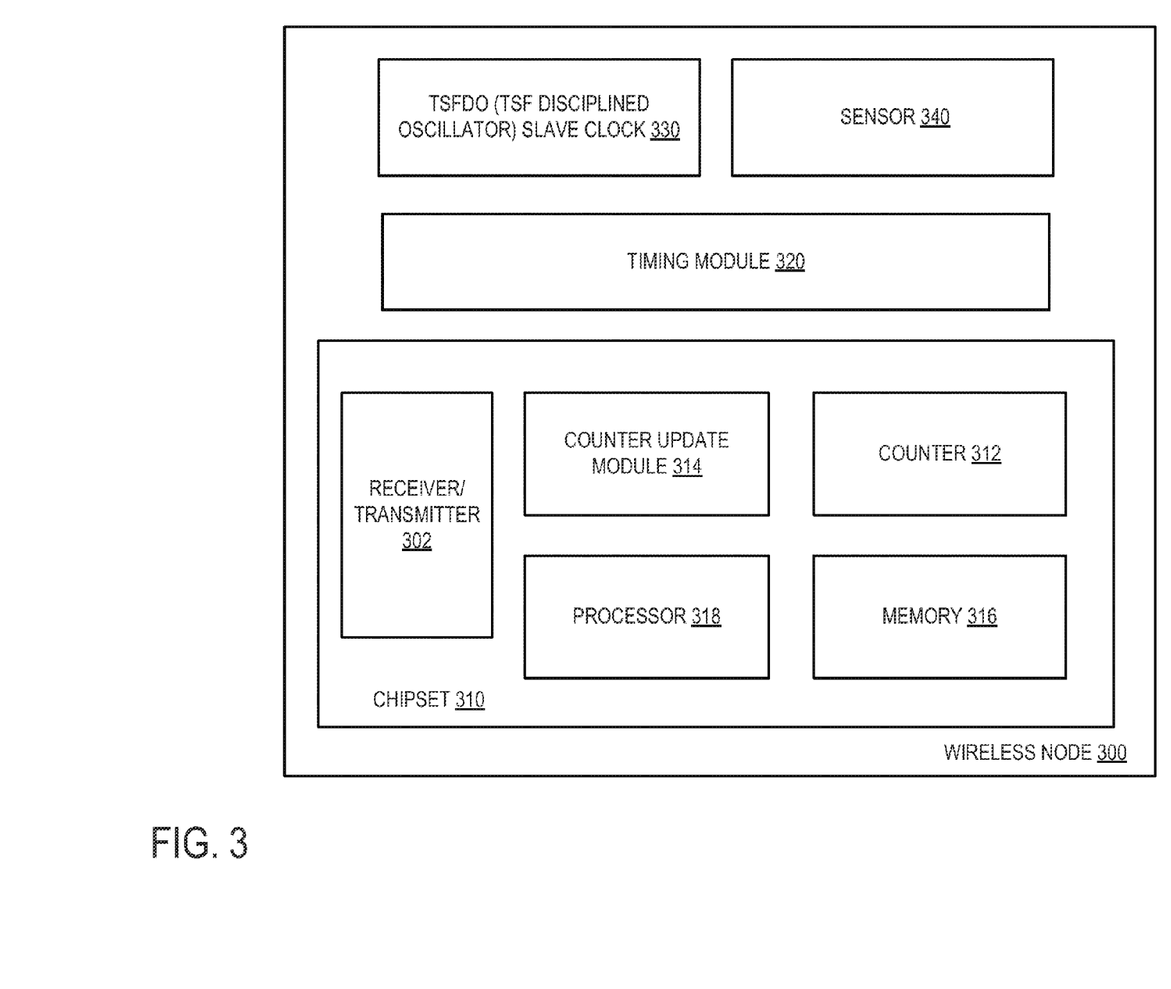
FIG. 3 is a block diagram illustrating a node according to various embodiments.

FIG. 3 is a block diagram illustrating a system according to various embodiments. Wireless node 300 includes a chipset 310. Chipset 310 can be an IEEE 802.11 chipset or other chipset suitable for wireless communications. Various components, modules, etc. shown within chipset 310 could be external to chipset 310 in certain embodiments.

Receiver 302 receives a timing synchronization function (TSF) timestamp from a wireless access point in a network. The received TSF timestamp is synchronized to a global clock (e.g., GPS). Counter 312 is incremented according to a reference clock. Counter update module 314 updates counter 312 according to the received TSF timestamp. In some embodiments, the reference clock may drift with respect to the global clock. In response, slave clock 330 (TSF disciplined oscillator (TSFDO)) may be adjusted by the timing module 320 to match the frequency and phase of the global clock as closely as possible. The slave clock 330 may be used as a timing reference for data sampling at the sensor 340 and/or time stamping of the sampled data. In some embodiments, the TSFDO may be implemented using a control loop and, for example, a voltage controlled crystal oscillator (VCXO), a voltage controlled temperature compensated crystal oscillator (VCTCX), or a digitally compensated crystal oscillator.

In alternate embodiments, node 300 may have a single clock which may drive the internal chipset and counter 312 and may be responsible for sampling sensor data for sensor 340. In some of these embodiments, this single clock may be a TSFDO which may be adjusted by the timing module 320 to match the frequency and phase of the global clock. In some embodiments with a single clock, the single clock may not be compensated by the timing module, and data time stamping may be done soon after the arrival of the TSF beacons to minimize the effects of clock drift.

Timing module 320 receives a global timing offset (GTO) message (e.g., via receiver 302) from an access point (AP). Timing module 320 combines information from the GTO message with counter information from counter 312 to generate a global timestamp.

Sensor 340 is used to collect sensory data such as, for example, seismic data (e.g., vibrations, etc.), temperature data, and/or other external sensory information. In various embodiments, the value of the sensory data is time dependent. Thus, the global timestamps described herein can be used to tag sensory data with a globally accurate timestamp. In this way, time dependent sensory data is synchronized across an entire array of network sensors, including sensors that cross into different cells serviced by different access points.

Sensor 340 may sample data at a sampling frequency, which can be calibrated and/or synchronized to slave clock 330 and/or adjusted by timing module 320 (e.g., using TSF timestamps, as described herein).

Memory 316 can be used to store sensory data from sensor 340. In some embodiments, sensory data 340 could be transmitted elsewhere for storage. Memory 316 may also be used as a computer-readable storage medium containing instructions for synchronizing wireless node 300 as described herein. Such instructions can be executed by processor 318.

Rather than storing sensory data in memory 316, in alternate embodiments, transmitter 302 may send sensory data to a data collection center for processing and storage.

Figure 4:
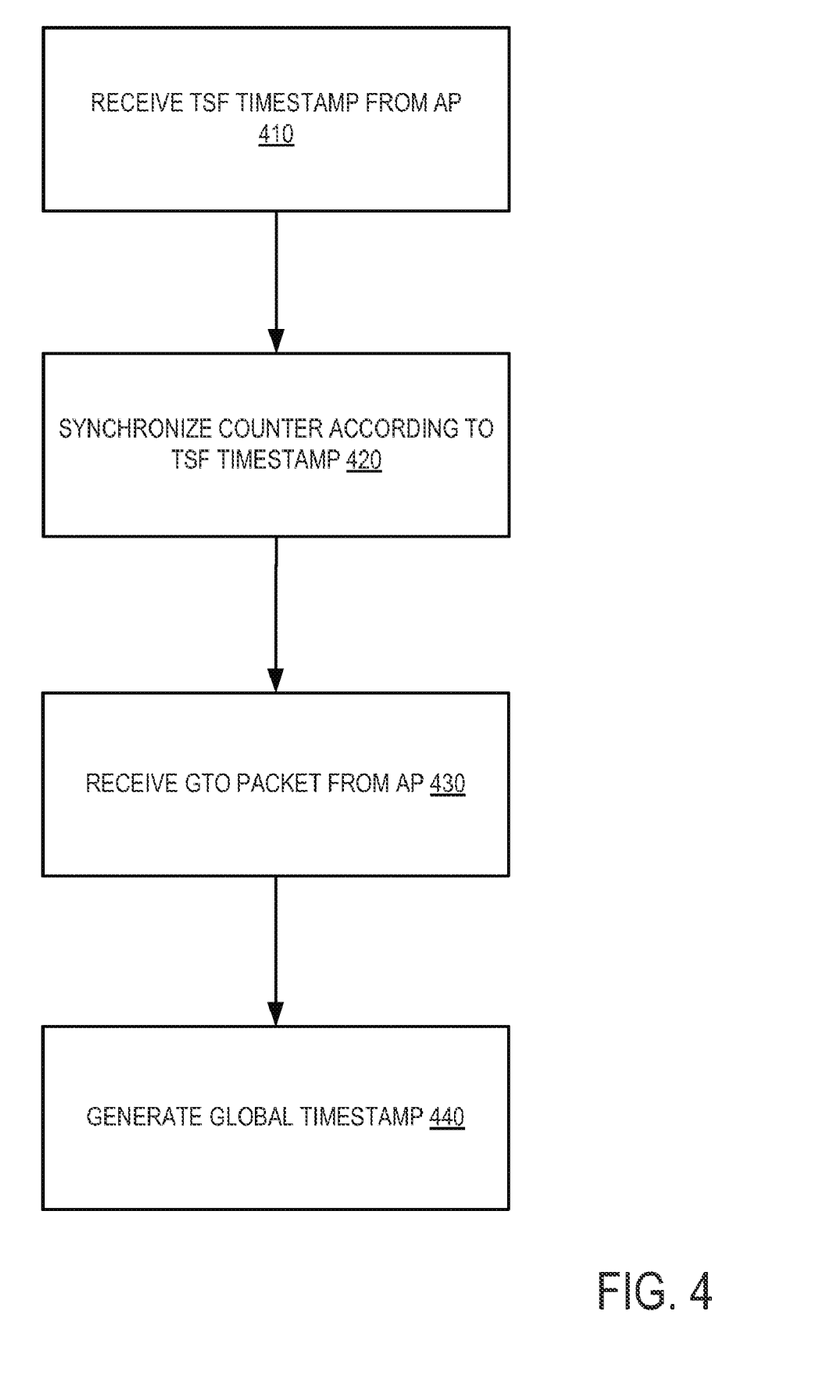
FIG. 4 is a flow diagram of operation in a system according to various embodiments.

FIG. 4 is a flow diagram of operation in a system according to various embodiments. The operations described with respect to FIG. 4 may be performed in a different order than shown; also, more operations or fewer operations might be performed in different embodiments. In general, the operations are performed on or at a wireless node belonging to a wireless network.

The wireless node receives 410 a beacon from a wireless access point. The beacon, or beacon frame, includes a time synchronization function (TSF) timestamp according to a wireless protocol. IEEE 802.11 is an example of a wireless protocol that includes time synchronization functionality with the protocol/standard; other suitable wireless protocols could be used in different embodiments. The received TSF timestamp is generated with reference to a global clock (e.g., GPS) for the network.

A local counter on the wireless node is synchronized 420 according to the TSF timestamp. In various embodiments, the counter is synchronized by comparing a current counter value to a received TSF timestamp and adjusting the counter to align with the TSF timestamp value.

The wireless node receives 430 a global timing offset (GTO) packet from the access point (which may be included in the same Beacon frame as the TSF timestamp or a different Beacon frame). Information from the GTO packet is combined with a counter value from the TSF-synchronized counter to generated 440 a global timestamp that may be used by the wireless node for various purposes including, but not limited to, tagging data (e.g., sensory data) with the global timestamp, adjusting the frequency and phase of the data sampling clock.

Figure 5:
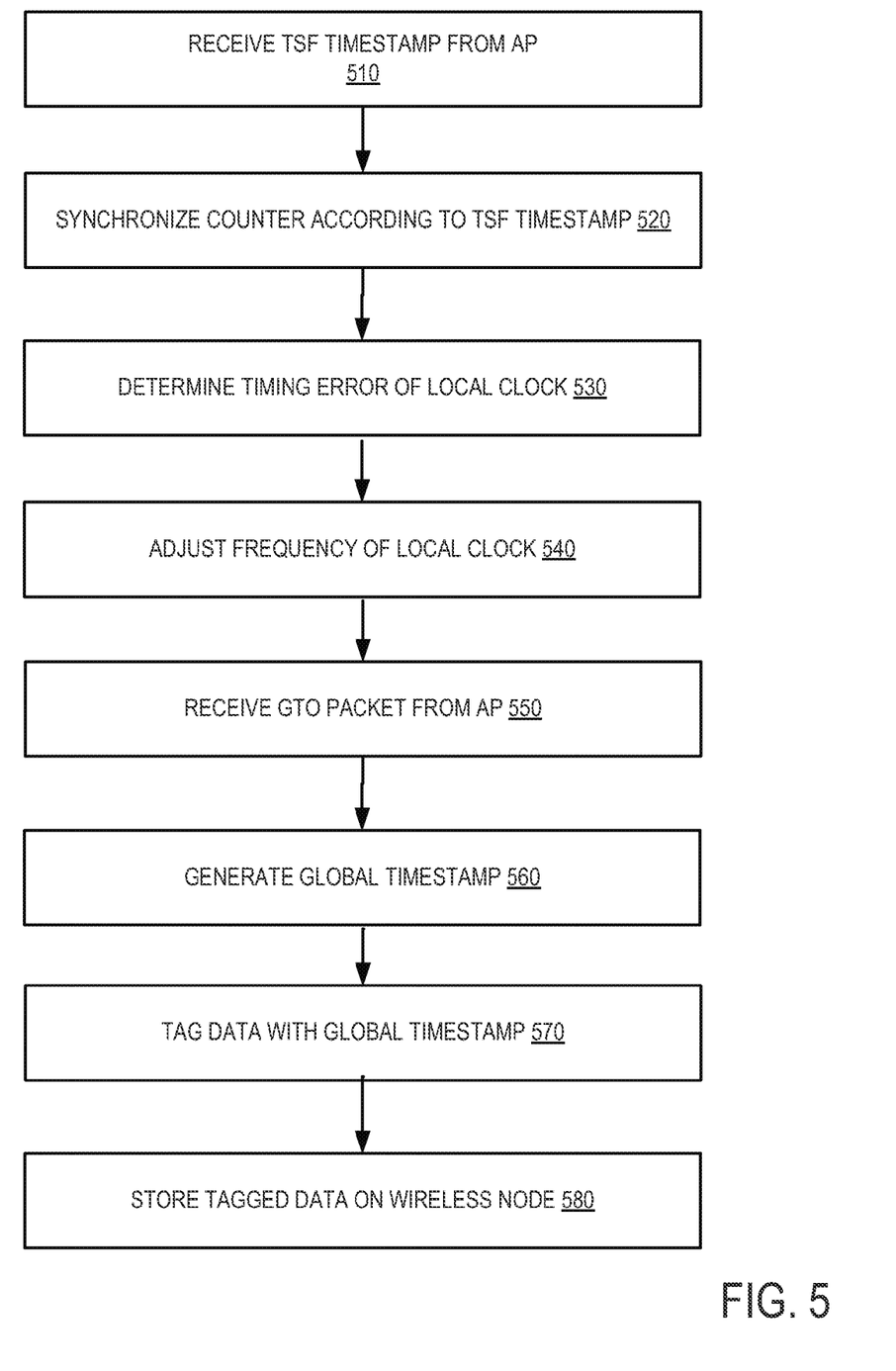
FIG. 5 is a flow diagram of operation in a system according to various embodiments.

FIG. 5 is a flow diagram of operation in a system according to various embodiments. As with FIG. 4, the operations described with respect to FIG. 5 may be performed in a different order than shown; also, more operations or fewer operations might be performed in different embodiments. In general, the operations are performed on or at a wireless node belonging to a wireless network.

A wireless node receives a 510 TSF timestamp from an access point. A TSF timestamp is one that has been generated (e.g., by the access point) with reference to a global clock (e.g., GPS clock) using timing synchronization functionality of the wireless protocol used by the network. A local counter on the wireless node is synchronized 520 according to the TSF timestamp. In various embodiments, the counter is synchronized by comparing a current counter value to a received TSF timestamp and adjusting the counter to align with the TSF timestamp value. The counter could be a counter on a chipset (e.g., 802.11 chipset) tied to a reference clock or it could be an independent counter tied to a reference clock on the wireless node. As an example, the counter might be designed to tick once per microsecond.

In various embodiments, the wireless node determines 530 a timing error of a local clock on the wireless node in view of the TSF timestamp. For example, if the value of the node's counter is different than a value associated with the TSF timestamp, then it is possible that the frequency of the reference clock to which the counter is tied has drifted (e.g., fast or slow). Thus, in addition to adjusting the counter value to match the TSF timestamp, the wireless node may adjust 540 the frequency of its local/reference clock if the timing error is non-trivial. In embodiments that include a sensor on the wireless node, the sensor may have its own clock, which could also be synchronized based on a timing error computed using a TSF timestamp.

The wireless node receives 550 a global timing offset (GTO) packet from an access point. Examples of GTO packets are described above. In certain embodiments, only a single GTO packet is generated and sent to wireless nodes in the network for synchronization purposes. However, GTO packets may be sent periodically to facilitate greater precision in timing synchronization on the network. The wireless node generates 560 a global timestamp using the GTO packet and a counter value from the wireless node. As described previously, $T_{GPS}(t)=T_{GTO}(t)+T_{TSF}(t)$, where $T_{TSF}(t)$ is the value of the TSF counter of the wireless node at time t.

Using a global timestamp, the wireless node tags 570 data. For example, a sensor on the wireless node may collect seismic data. In an application where hundreds and thousands of sensors across a geographic area are similarly being used to collect seismic data, the collected data becomes more meaningful if it can be synchronized in time. Thus, as a sensor samples data (e.g., according to a sampling frequency), the data can be tagged with a global timestamp that is synchronized in time according to a reference point with respect to a global timing source (e.g., GPS).

In some embodiments, as discussed above, a wireless node clock is adjusted based on TSF timestamps to compensate for clock drift. Thus, data are sampled and tagged using a globally accurate timestamp. In other embodiments, a wireless node clock is not adjusted based on TSF timestamps. Thus, sampled and tagged data may not be globally synchronized initially. However, in such embodiments, data may be tagged immediately after reception of TSF timestamps and/or GTO information. Such data can be post processed at a later time based on the TSF timestamps and/or GTO information to produce the same globally accurate data samples.

The invention claimed is:

1. A method, comprising:
a wireless node receiving from a wireless access point a beacon having a wireless protocol time synchronization function (TSF) timestamp generated with reference to a global clock for a network;
synchronizing a counter on the wireless node according to the TSF timestamp;
receiving a global timing offset (GTO) packet from the wireless access point; and
combining information from the GTO packet with a counter value to generate a global timestamp.

2. The method of claim 1, further comprising:
tagging data on the wireless node with the global timestamp.

3. The method of claim 2, wherein the data on the wireless node is collected by a sensor on the node.

4. The method of claim 2, further comprising:
storing the tagged data in a memory on the wireless node.

5. The method of claim 1, further comprising:
determining a timing error of a local clock on the wireless node in view of the TSF timestamp; and
adjusting an operational frequency of the local clock based at least in part on the timing error.

6. The method of claim 5, wherein adjusting the operational frequency of the local clock comprises adjusting the operational frequency of an oscillator.

7. A wireless node, comprising:
a receiver to receive a timing synchronization function (TSF) timestamp from a wireless access point in a network, wherein the TSF timestamp is synchronized to a global clock for the network;
a counter update module to update a counter according to the TSF timestamp; and
a timing module to
receive a global timing offset (GTO) message for the network, and
combine information from the GTO message with counter information to generate a global timestamp.

8. The wireless node of claim 7, further comprising:
a sensor to collect the sensory data; and
the timing module to tag the sensory data with the global timestamp.

9. The wireless node of claim 8, further comprising:
an oscillator to maintain a local clock; and
the timing module further to
determine a timing error of the local clock based at least in part on the TSF timestamp, and
adjust an operating frequency of the oscillator in view of the timing error.

10. The wireless node of claim 8, further comprising:
a memory to store the tagged sensory data.

11. The wireless node of claim 8, further comprising:
a transmitter to send the sensory data to a data collection center.

12. A system, comprising:
a plurality of wireless access points associated with a network, each having a clock that is synchronized to a global clock for the network;
a cluster of wireless nodes associated with each access point in the network, wherein wireless nodes are time synchronized to each other across clusters via timing synchronization function (TSF) timestamps sent from respective wireless access points.

13. The system of claim 12, wherein the global clock comprises a global positioning system (GPS) clock.

14. The system of claim 12, wherein the wireless nodes in the network each collect sensory data for a common purpose.

15. A non-transitory computer-readable storage medium containing instructions that, when executed, cause a computer to:
synchronize a counter on a wireless node according to a received wireless protocol time synchronization function (TSF) timestamp generated with reference to a global clock for a network;
receive a global timing offset (GTO) packet from a wireless access point; and
combine a GTO value from the GTO packet with a counter value to form a global timestamp.

16. The non-transitory computer-readable storage medium of claim 15, comprising further instructions that cause the computer to:
tag data on the wireless node with the global timestamp.

17. The non-transitory computer-readable storage medium of claim 15, comprising further instructions that cause the computer to:
compute a timing error of a local clock on the wireless node in view of the TSF timestamp; and
adjust an operating frequency of the local clock based at least in part on the timing error.

18. The non-transitory computer-readable storage medium of claim 15, comprising further instructions that cause the computer to:
store tagged data in a memory on the wireless node.

19. The non-transitory computer-readable storage medium of claim 15, wherein the instructions that cause formation of a global timestamp comprise further instructions that cause the computer to:
a value of $T_{GPS(t)}$ to compensate for AP-to-node distance and a corresponding propagation delay of the wireless signal, where $T_{GPS(t)}$ represents a time elapsed between a predetermined time origin and a time t.

* * * * *

UNITED STATES PATENT AND TRADEMARK OFFICE
CERTIFICATE OF CORRECTION

| | |
|---|---|
| PATENT NO. | : 8,279,897 B2 |
| APPLICATION NO. | : 12/715774 |
| DATED | : October 2, 2012 |
| INVENTOR(S) | : Jung Gun Lee et al. |

It is certified that error appears in the above-identified patent and that said Letters Patent is hereby corrected as shown below:

In column 8, line 22, in Claim 19, delete "a" and insert -- compute a --, therefor.

Signed and Sealed this
Ninth Day of April, 2013

Teresa Stanek Rea
*Acting Director of the United States Patent and Trademark Office*